United States Patent
Walker, Jr.

(10) Patent No.: US 8,500,398 B1
(45) Date of Patent: Aug. 6, 2013

(54) TURBOCHARGER HEAT SHIELD

(75) Inventor: Robert A. Walker, Jr., Santa Clarita, CA (US)

(73) Assignee: Walker Design, Inc., Sun Valley, CA (US)

( * ) Notice: Subject to any disclaimer, the term of this patent is extended or adjusted under 35 U.S.C. 154(b) by 936 days.

(21) Appl. No.: 12/576,972

(22) Filed: Oct. 9, 2009

Related U.S. Application Data (60) Provisional application No. 61/104,223, filed on Oct. 9, 2008.

(51) Int. Cl.
*F01D 25/26* (2006.01)

(52) U.S. Cl.
USPC .......................................... 415/177; 415/205

(58) Field of Classification Search
USPC ......................................... 415/108, 177, 232
See application file for complete search history.

(56) References Cited

U.S. PATENT DOCUMENTS

| | | | |
|---|---|---|---|
| 7,074,009 B2 * | 7/2006 | Allmang et al. | 415/177 |
| 7,891,942 B2 * | 2/2011 | Hsu | 415/184 |
| 2002/0085932 A1 * | 7/2002 | Loffler et al. | 417/407 |

FOREIGN PATENT DOCUMENTS

| | | | |
|---|---|---|---|
| DE | 3439738 A1 * | 4/1986 | |
| DE | 10336978 B3 * | 1/2005 | |

OTHER PUBLICATIONS

English Translation of DE 103 36 978 B3. Accessed EPO website: Aug. 29, 2012. 4 pages.*
DE 3439738 A1 Machine Translation. Accessed EPO website Dec. 28, 2012. 2 Pages.*

* cited by examiner

*Primary Examiner* — Richard Edgar
(74) *Attorney, Agent, or Firm* — Novak Druce Connolly Bove + Quigg LLP (57) ABSTRACT

A turbocharger heat shield is disposed around a turbocharger turbine housing and comprises first and second heat shield members each having a wall structure that is generally semi-cylindrical in shape. The heat shield members are removably attached with one and include axially opposed openings, and a radial opening, to accommodate passage of other turbocharger components therethrough. A third heat shield member may be included to cover a further element of the turbocharger. One or more tabs project from an edge of the first or second heat shield member to register with an adjacent edge of the other member to facilitate alignment, engagement and/or attachment between the two members. An insulating material can be interposed between the heat shield and the turbocharger housing and, in a preferred embodiment, is attached to the heat shield.

16 Claims, 9 Drawing Sheets

FIG. 9

TURBOCHARGER HEAT SHIELD

CROSS-REFERENCE TO RELATED APPLICATIONS

This application claims the benefit of U.S. Provisional Application No. 60/104,223 filed Oct. 9, 2008, which is herein incorporated by reference in its entirety.

FIELD OF THE INVENTION

The present invention relates generally to the field of turbochargers and, more particularly, to a heat shield that is specifically constructed and configured for fitment around at least a portion of a turbocharger.

BACKGROUND OF THE INVENTION

Turbochargers for gasoline and diesel internal combustion engines are known devices used in the art for pressurizing or boosting the intake air stream, routed to a combustion chamber of the engine, by using the heat and volumetric flow of exhaust gas exiting the engine. Specifically, the exhaust gas exiting the engine is routed into a turbine housing of a turbocharger in a manner that causes an exhaust gas-driven turbine to spin within the housing.

The exhaust gas-driven turbine is mounted onto one end of a shaft that is common to a radial air compressor impeller mounted onto an opposite end of the shaft. Thus, rotary action of the turbine also causes the air compressor impeller to spin within a compressor housing of the turbocharger that is separate from the turbine housing. The spinning action of the air compressor impeller causes intake air to enter the compressor housing and be pressurized or boosted a desired amount before it is mixed with fuel and combusted within the engine combustion chamber.

The amount by which the intake air is boosted or pressurized can be controlled by regulating the amount of exhaust gas that is passed through the turbine housing by a wastegate and/or by one or more variable geometry members that are disposed within the turbocharger, such as those used in conventional variable geometry turbochargers. The wastegate and/or variable geometry members can be used to control the total amount of boosted air provided to the engine and/or to regulate the delivery of the same to control unwanted turbo lag.

Turbochargers used with internal combustion engines that are used with motor vehicles, such as cars or trucks or the like, are typically positioned within the engine compartment beneath an engine compartment hood, where the user of the car or truck is not easily exposed to the turbocharger. However, turbochargers are also placed into service with internal combustion engines that may not be protected or otherwise covered by an engine compartment hood. For example, turbochargers used with inboard-powered boats are placed on or near internal combustion engines that are mounted within the boat and that may or may not be covered at all. Also, turbochargers used with internal combustion engines used to power race cars are sometimes left exposed and are not covered.

Because the turbine housing of turbochargers are attached to the exhaust system of the internal combustion engine for receiving exhaust gas therefrom, during operation of the internal combustion engine the turbine housing and other attached components of the turbocharger can reach temperatures that are very hot, and that can easily burn a person that comes into contact with or that comes close to contacting the same. Such contact can be inadvertent or can be necessary, for example when the person is servicing or otherwise working on the turbocharger engine system.

Attempts in the past have been made to address the issue of protecting users from being burned or otherwise injured by the heat emitted from turbochargers, and have been embodied in the form of a wrap of blanket formed from a heat resistant material that is wrapped around the turbocharger. While such attempts had helped to insulate the hot turbocharger from direct contact by a user, the use of such material wraps or blankets can become detached from the turbocharger during operation, and are unsightly. Further, such wraps or blankets, while wrapping around a desired portion of a turbocharger, may cover certain actuating elements of a turbocharger, which coverage can interfere or impair the proper operation of the same. Additionally, in the event of an oil leak from the turbocharger, such wraps or blankets can become wetted and/or saturated and can provide a basis for a sustained fire.

It is therefore desired that a device be constructed that is configured in a manner that can shield or protect a user from the heat of a turbocharger. It is further desired that such device be constructed in a manner that provides a removable attachment with the turbocharger that will not become unintentionally detached. It is further desired that the device be configured in a manner that does not impair or otherwise interfere with the proper operation of any actuating elements of the turbocharger, and minimizes the possibility of a fire hazard. It is further desired that the device be constructed in a manner that does not detract from the overall appearance of the turbocharger engine system.

SUMMARY OF THE INVENTION

Turbocharger heat shields, constructed in accordance with principles of the invention, are configured for use with a turbocharger generally comprising a turbine housing, a center housing, and a compressor housing. Together, the heat shield and the turbocharger make up a turbocharger assembly. The heat shield is configured to fit around or surround a desired portion of the turbocharger, and in a preferred embodiment, to surround the turbine housing for the purpose of protecting against unwanted direct contact by a person, e.g., to protect against an unwanted burn.

The heat shield comprises first and second heat shield members that each comprise a wall structure that is generally semi cylindrical in shape. The first and second heat shield members are removably attached with one another after placement around the desired turbocharger housing, e.g., the turbine housing. The first and second heat shield members include axially opposed openings, and a radially oriented opening, to facilitate passage and fitment around other turbocharger components. The heat shield may comprise a third member that is attached to one of the first and second members to cover a further element of the turbocharger, such as an actuator or the like.

The first and/or second heat shield members include means, e.g., in the form of tabs, that project outwardly from an edge or a lip for the purpose of registering with an adjacent edge or lip of the other of the first or second heat shield, thereby facilitating aligning the two members during attachment. Additionally, such means can be configured to accommodate an attachment element used to attach the first and second heat shield members. If desired, an insulating material can be interposed between the heat shield and the turbocharger housing and, in a preferred embodiment, is attached to the heat shield.

Configured in this manner, the heat shield operates to shield or protect a user from the heat of a turbocharger. Further, the heat shield is constructed in a manner that provides a removable attachment with the turbocharger that will not become unintentionally detached. Further, the heat shield is configured in a manner that does not impair or otherwise interfere with the proper operation of any actuating elements of the turbocharger, and minimizes the possibility of a fire hazard. Further, the heat shield is constructed in a manner that does not detract from the overall appearance of the turbocharger engine system.

BRIEF DESCRIPTION OF THE DRAWINGS

The details and features of the present invention will be more clearly understood with respect to the detailed description and the following drawings wherein.

DETAILED DESCRIPTION OF THE INVENTION

A turbocharger heat shield, according to an exemplary embodiment of the present invention, is constructed having two or more rigid structural members that are releasibly attached to one another, and that are specially configured to both cover a desired portion of a turbocharger and do so in a manner that does not impair or restrict operation of any movable elements positioned on the turbocharger. In an example embodiment, the turbocharger heat shield comprises two shield members that are configured to fit together to surround a turbine housing of the turbocharger, and further includes an actuator member that is attached to one of the shield members and that is configured to cover at least a portion of a turbocharger actuator, and do so in a manner that does not impair proper actuator movement or operation.

Figure 1:
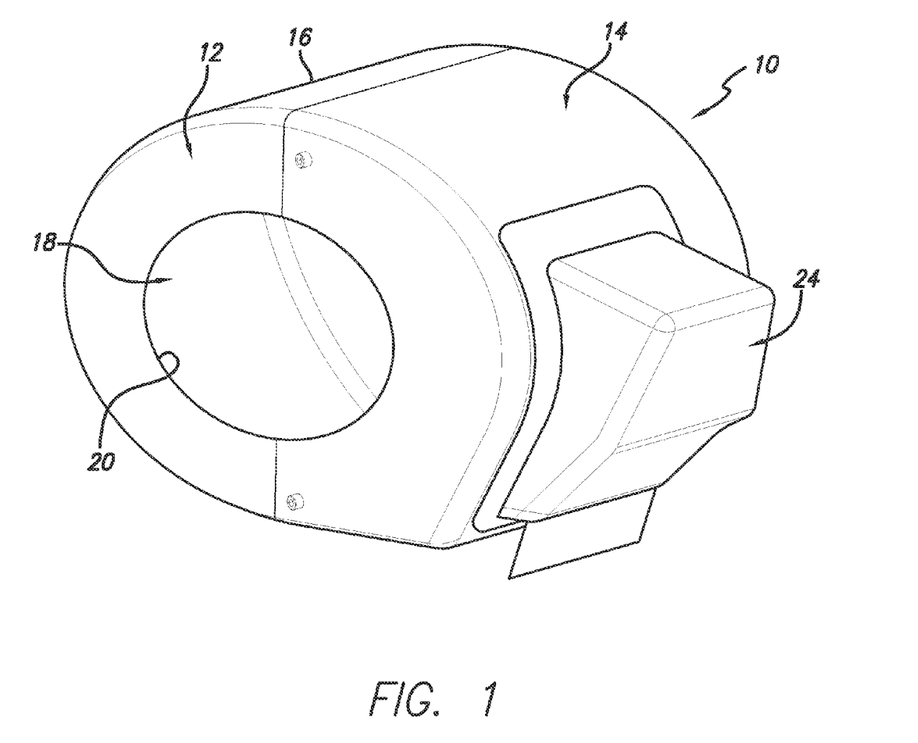
FIGS. 1 to 3 are a perspective side views of a example embodiment turbocharger heat shield constructed according to an embodiment of the present invention.
Figure 2:
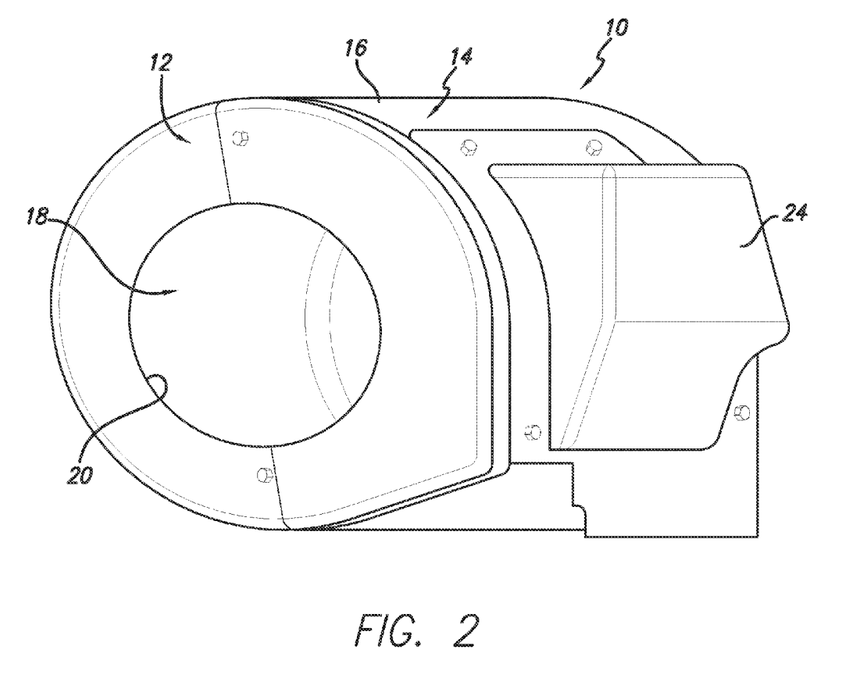
Figure 3:
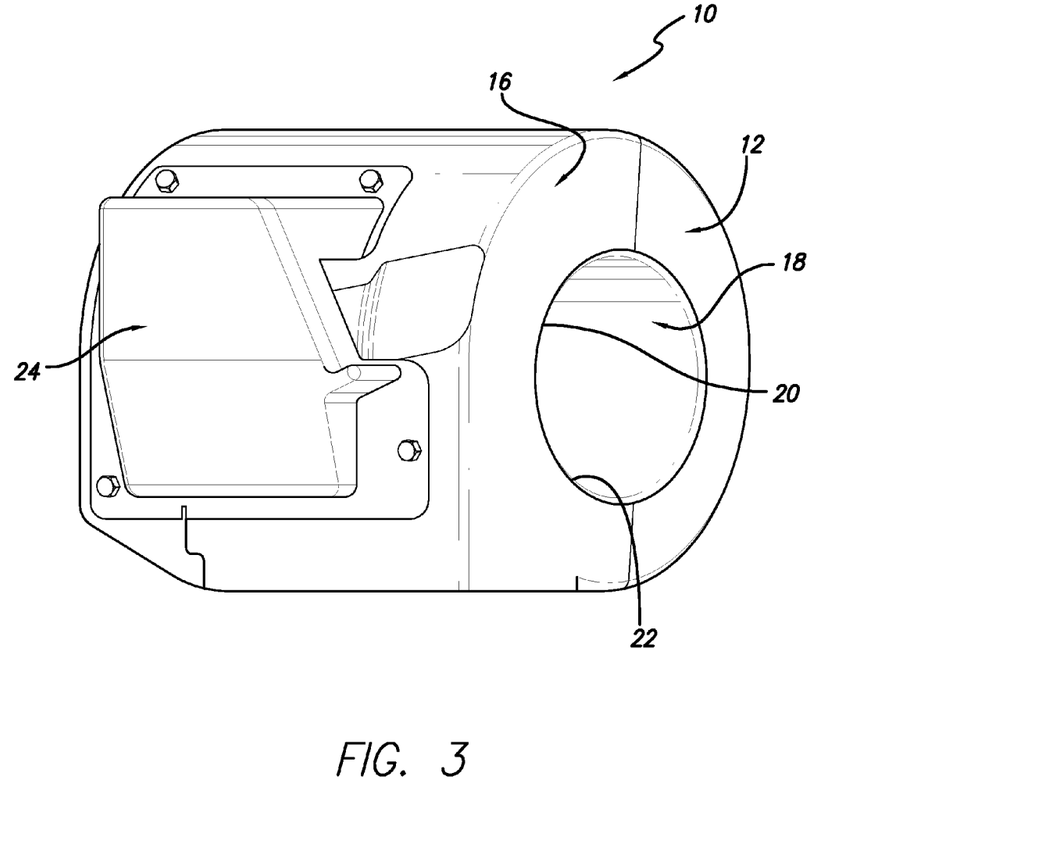

FIGS. 1 to 3 illustrate an example embodiment turbocharger heat shield 10, constructed according to principles of the invention, comprising a first shield member 12 that is releasably attached to a second heat shield member 14. The heat shield members 12 and 14 are formed from a rigid structural material, such as a metallic material or the like. I feature of the material selected to form the heat shield members it that it be both structurally rigid and maintain such structural rigidity when exposed to the operating temperature of a turbocharger. In an example embodiment, that heat shield members are formed form stainless steel.

The shield members 12 and 14 combine to provide a heat shield structure having a generally cylindrical outer surface 16 within an inner chamber or cavity 18 extending from a first opening 20 at one axial end of the structure to a second opening 22 (best shown in FIG. 3) at an opposite axial end of the structure. The inner chamber 18 is sized and shaped to accommodate fitment of the shield members around a desired portion of the turbocharger. In an example embodiment, the inner chamber is sized and shaped to accommodate fitment around a turbine housing of the turbocharger, thereby operating to insulate the same from direct contact by a user.

The heat shield 10 can be constructed to additionally include a actuator member 24 that is attached to one of the shield members 12, 14, and that is sized and shaped for placement over a movable element of the turbocharger, e.g., an actuator or the like. As described below, the actuator cover is configured to both cover the movable member of the turbocharger while also not interfering with the proper operation of the same. The actuator member can be formed from the same types of materials noted above for the shield members.

As noted above, the turbocharger heat shield of this invention can be formed from two or more members that are configured to be attached to one another for placement over a desired portion of a turbocharger. If desired, the turbocharger heat shield can be configured for placement over the entire turbocharger. In an example embodiment, however, the heat shield is configured for placement over the turbine housing. Additionally, with the heat shield can be formed from a number of different elements, in a preferred embodiment, the heat shield is formed from two primary members; namely a first shield member 12 and a second shield member 14 that are configured for releasable attachment with one another. As better described below, in an example embodiment, the first and second shield members are designed to provide a slip fit with one another through the use of one or more alignment and/or positioning tabs or the like that operate to ensure the proper alignment and engagement between the members.

Figure 4:
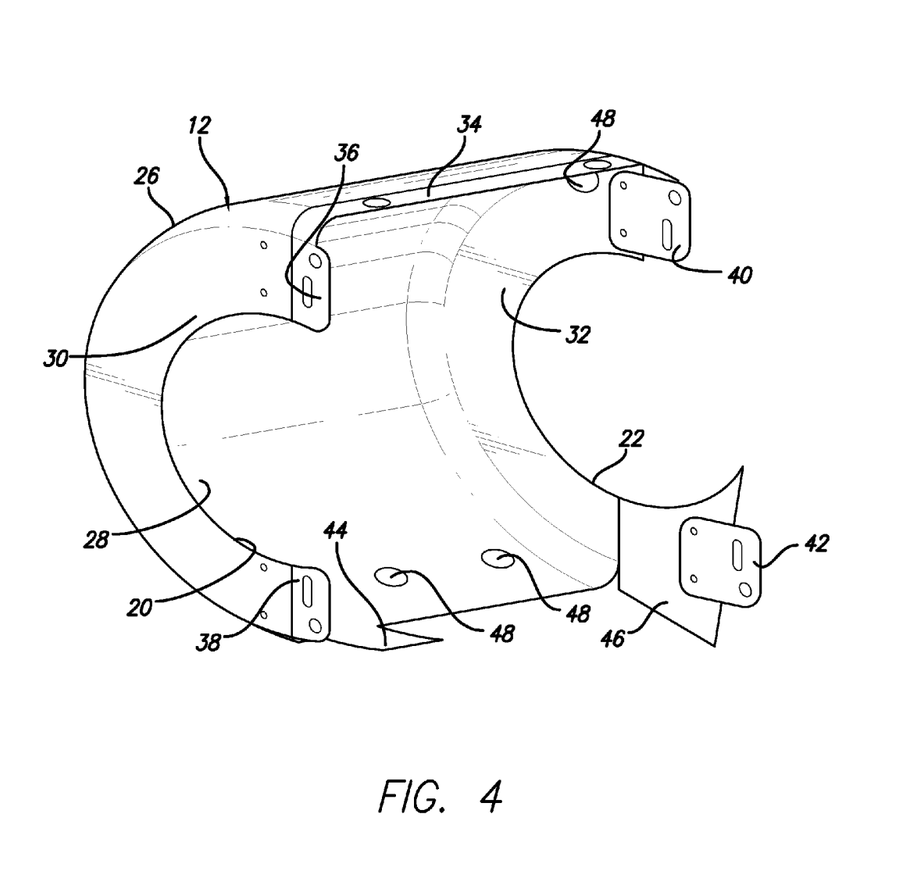
FIG. 4 is a perspective side view of a example embodiment first shield member used to form the heat shield of FIGS. 1 to 3.

FIG. 4 illustrates a first shield member 12, constructed according to principles of this invention, used for forming the turbocharger heat shield. In an example embodiment, the first shield member 12 is configured having body with a generally semicircular outside surface 26 that extends along a partial circumference of the shield member 12. An inside surface 28 of the first shield member has a shape defined by the semicircular outside surface, and has a radius of curvature that is sized to permit fitment of the first shield member over the turbine housing. It is to be understood that the exact radius of curvature can and will vary depending on the particular turbocharger application. In an example embodiment, the first heat shield member may have an inside surface that is sized to provide a gap of at least ⅛ of an inch from the turbine housing. Alternatively, the first heat shield member can be sized so it conforms closely to the underlying turbocharger housing surface.

If desired, an insulating material can be provided within the first shield member 12 along the inside surface 28. The insulating material can be selected from those conventionally used to provide a desired degree of heat insulation. The insulating material may or may not be attached to the inside surface. For example, the insulating material can be attached to the inside surface by use of mechanical means, such as by using a fixture or the like, or can be attached by chemical means, such as by using a high-temperature adhesive. The insulating material can also be attached by brazing, welding or the like, and/or encapsulating in a metal skin and bonding the insulating pad to the inside surface of the shield member. In the event that the insulating material is encapsulated as noted above, this operates to reduce the chance of the insulating material possibly retaining oil, thereby reducing the chance of fire.

The first shield member 12 includes a first wall 30 that extends radially inwardly a distance from the outside wall 26 forming a portion of the first opening 20. In an example embodiment, the first opening is sized to fit around a portion of the turbine housing, e.g., an exhaust gas outlet. The first shield member 12 also includes a second wall 32 positioned opposite from the first wall that extends radially inwardly a distance from the outside wall 26, and that forms a portion of the second opening 22. In an example embodiment, the second opening is sized to fit around a portion of the turbine housing, e.g., a portion defined between the turbine housing and a center or bearing housing of the turbocharger.

In an example embodiment, the first shield member 12 is configured including a one or more assembly tabs that are configured to assist alignment and/or attachment with the second shield member. As shown in FIG. 4, in an example embodiment, the first shield member includes an axially extending tab 34 that is positioned along a top lip of the body and that extends between the first and second wall surfaces 28, 30. The axially extending tab can be provided in the form of a separate part that is attached, e.g., welded, to the shield member body or the shield member can be formed with the axially extending tab as an integral member thereof. The axially extending tab 34 is preferably recessed a distance beneath the outside surface to facilitate fitment with an inside surface of the second shield member.

In an example embodiment, the first shield member 12 includes other tabs 36, 38, 40 and 42 that are attached or formed integrally with the first shield member and that operate to facilitate alignment and/or attachment with the second shield member. In an example embodiment, one or more of the tab members include attachment features, e.g., threaded openings, to accommodate attachment of the second shield member using threaded connection elements, such as by bolted connection. It is to be understood that the tabs can be configured to accommodate attachment with the second shield member by other conventional attachment methods. Like with the axially extending tab, the tabs, 36, 38, 40 and 42 are recessed a distance from the outside surface to facilitate a slip fit fitment with an inside surface of the second shield member such that the adjacent opposed edges of the first and second shield members align with and abut one another.

The first shield member also includes member elements 44 and 46 that are attached to the member body. The member elements 44 and 46 can be integrally formed with the body or formed as separate pieces that are attached to the body, e.g., by conventional technique such as by welding, brazing or the like. These member elements 44 and 46 operate to provide a desired further level of coverage over the respective turbocharger portion.

In an example embodiment, the first shield member 12 is configured having openings positioned along a portion of the body through the outside surface 26 and/or along one or more of the first and second walls 30 and 32. The openings are provided to facilitate attachment of the heat shield to the turbocharger, the surrounding engine, or other desired attachment point. In an example embodiment, nuts 48 or other suitable attachment means are welded or otherwise attached to the opening to facilitate the desired attachment of the first heat shield member.

Figure 5:
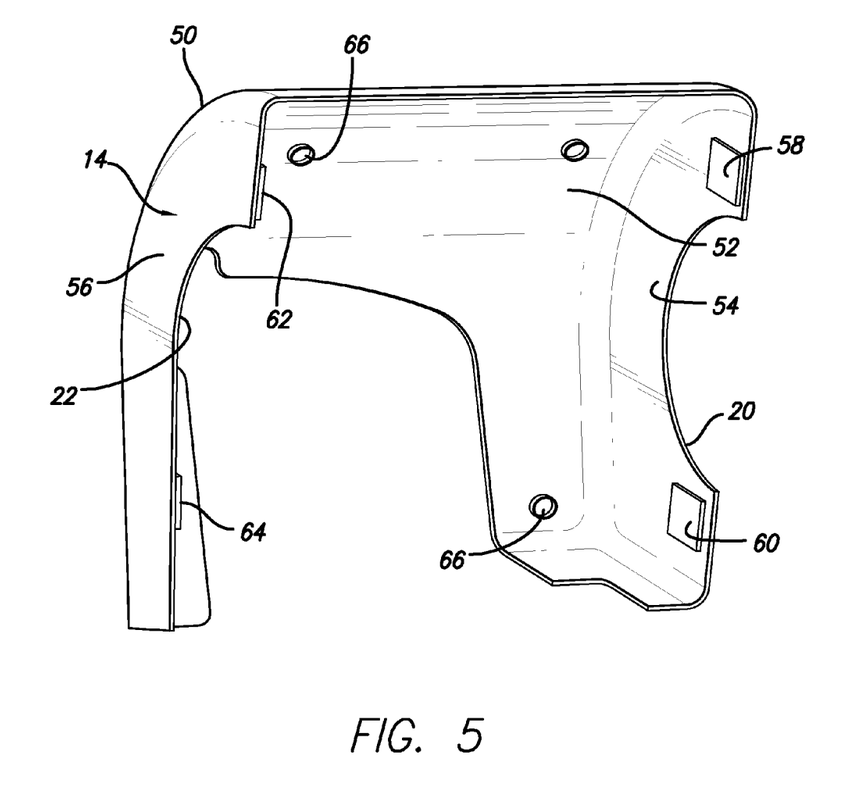
FIG. 5 is a perspective side view of a example embodiment second shield member used to form the heat shield of FIGS. 1 to 3.

FIG. 5 illustrates a second shield member 14, constructed according to principles of this invention, used for forming the turbocharger heat shield. In an example embodiment, the first shield member 14 is configured having body with a generally semicircular outside surface 50 that extends along a partial circumference of the shield member 14. An inside surface 52 of the second shield member has a shape defined by the semicircular outside surface, and has a radius of curvature that is sized to permit fitment of the second shield member over the turbine housing. It is to be understood that the exact radius of curvature can and will vary depending on the particular turbocharger application. In an example embodiment, the second heat shield member 14 can include an inside surface that is sized to provide a gap of at least ⅛ of an inch from the turbine housing. As noted above for the first heat shield member, the second heat shield member can also be configured so that it closely conforms to the underlying surface of the turbocharger housing.

If desired, an insulating material can be provided within the second shield member 14 along the inside surface 32. The insulating material can be selected from those conventionally used to provide a desired degree of heat insulation. The insulating material may or may not be attached to the inside surface. For example, the insulating material can be attached to the inside surface by use of mechanical means, such as by using a fixture or the like, or can be attached by chemical means, such as by using a high-temperature adhesive. The insulating material can also be attached by brazing, welding or the like. Additionally, as noted above, the insulating material can be encapsulated and the encapsulated insulating material can be attached to the inside surface of the second shield member.

The second shield member 14 includes a first wall 54 that extends radially inwardly a distance from the outside wall 50 forming a portion of the first opening 20. In an example embodiment, the first opening 20 is sized to fit around a portion of the turbine housing, e.g., an exhaust gas outlet. The second shield member 42 also includes a second wall 56 positioned opposite from the first wall that extends radially inwardly a distance from the outside wall 50, and that forms a portion of the second opening 22. In an example embodiment, the second opening is sized to fit around a portion of the turbine housing, e.g., a portion defined between the turbine housing and a center or bearing housing of the turbocharger.

In an example embodiment, the first shield member 14 is configured including a one or more assembly tabs that are configured to assist alignment and/or attachment with the first shield member. As shown in FIG. 5, in an example embodiment, the second shield member includes tabs 58, 60, 62 and 64 that are attached or formed integrally with the second shield member and that operate to facilitate attachment with the first shield member. In an example embodiment, one or more of the tab members include attachment features, e.g., threaded openings, to accommodate attachment of the first shield member using threaded connection elements, such as by bolted connection. It is to be understood that the tabs can be configured to accommodate attachment with the first shield member by other conventional attachment methods. The tabs, 58, 60, 62 and 64 are preferably recessed a distance from the outside surface 50 to facilitate fitment with an inside surface of the first shield member.

In an example embodiment, the second shield member 14 is configured having openings positioned along a portion of the body through the outside surface 50 and/or along the one or more of the first and second walls 54, 56. The openings are provided to facilitate attachment of the heat shield to the turbocharger, surrounding engine, or other desired attachment point. In an example embodiment, nuts 66 or other suitable attachment means are welded or otherwise attached to the opening to facilitate the desired attachment of the second heat shield member 14.

Figure 6:
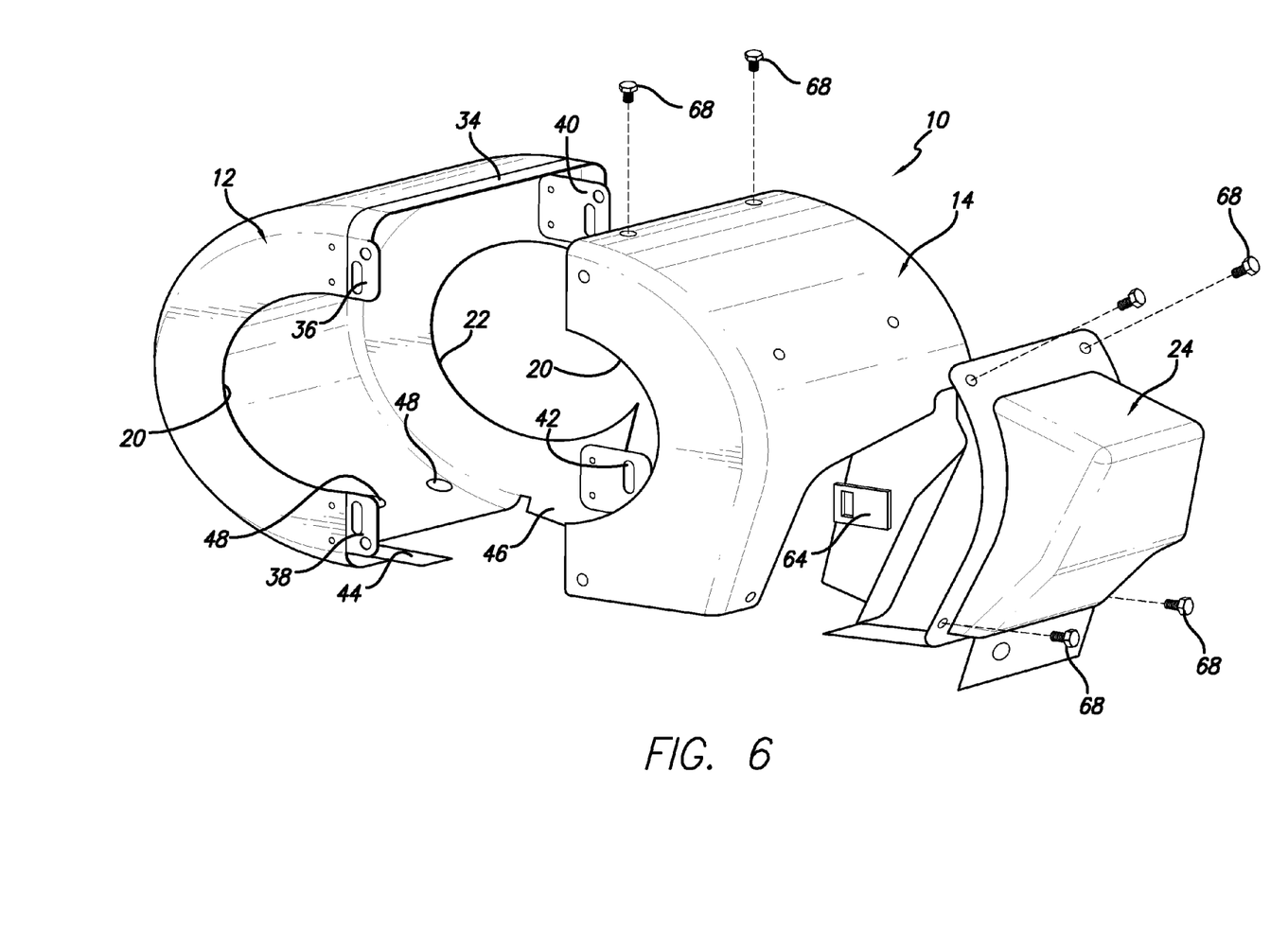
FIG. 6 is an exploded perspective side view of the first and second shield members and an actuator cover used to form the heat shield of FIGS. 1 to 3.

FIG. 6 illustrated an exploded view of the first and second shield members 12 and 14, and the actuator member 24 in a disassembled state. As illustrated, the first and second shield members 12 and 14 are joined together around a desired portion of the turbocharger so that the tabs 34, 36, 38, 40 and 42 of the first shield member 12 engages respective inside surface portions or tabs 58, 60, 62 (not shown) and 64 of the second shield member to provide a desired slip fit engagement. Suitable fasteners 68, e.g., provide in the form of screws or the like, can be used to attach the first and second shield members together, and can be used to attach the actuator member 24 to the second shield member.

Figure 7:
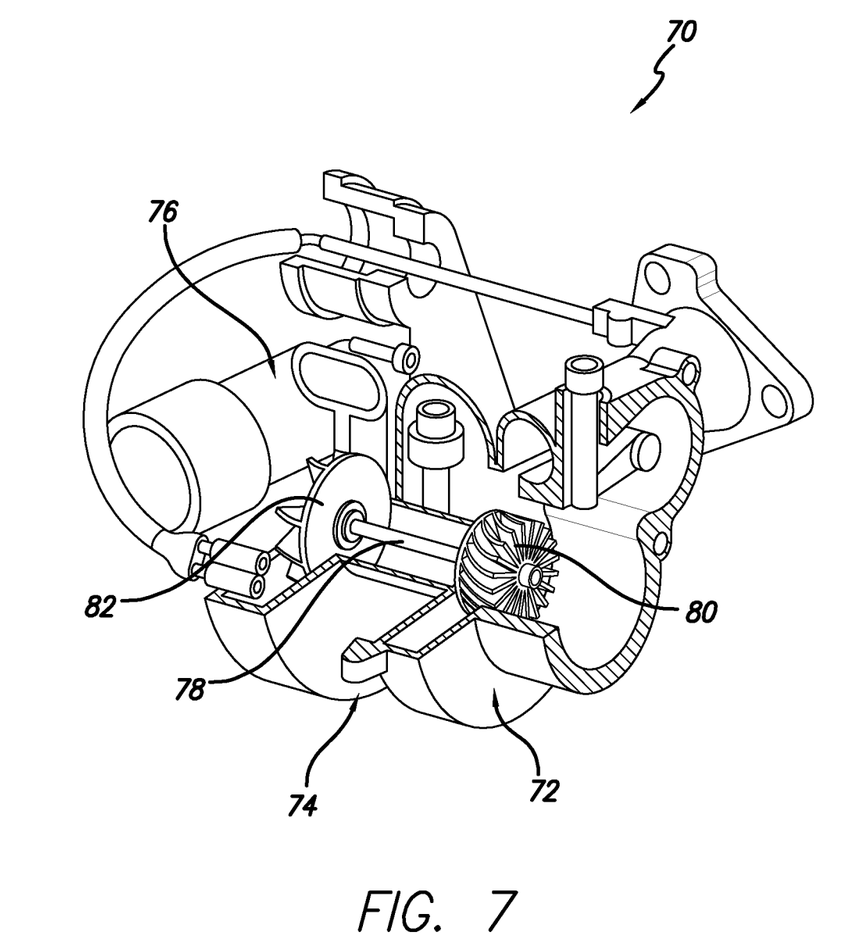
FIG. 7 is a perspective cut-away view of a conventional turbocharger.

FIG. 7 illustrates a turbocharger 70 that can be used with the heat shield as described above and illustrated in FIGS. 1 to 6. The turbocharger can be a conventional turbocharger or can be one including one or more variable geometry members disposed therein. In an example embodiment, the turbocharger 70 comprises a turbine housing 72 that is attached to a center or bearing housing 74. The center housing is interposed between the turbine housing and a compressor housing 76. A shaft 78 rotatably disposed in the center housing and has a turbine wheel 80 attached at one end, that is disposed within the turbine housing, and a compressor impeller 82, that is disposed within the compressor housing. The turbocharger illustrated in FIG. 7 is provided for the purpose of reference, and it is to be understood that the heat shield as described and illustrated in this patent application can be used with turbochargers that may be configured different than that as illustrated.

The turbine housing is configured having an exhaust gas inlet positioned upstream from the turbine wheel and an exhaust gas outlet positioned downstream from the turbine wheel, such that passage of exhaust gas into the turbine housing causes the turbine wheel to spin. As the turbine wheel spins it causes the compressor impeller to also spin. As the compressor impeller spins, it takes air passing into the compressor housing from an air inlet, pressurizes the air a desired amount, and passes the air through an air outlet of the compressor housing. The pressurizing air passing out of the turbocharger is directed to an intake system of an internal combustion engine for combustion.

Figure 8:
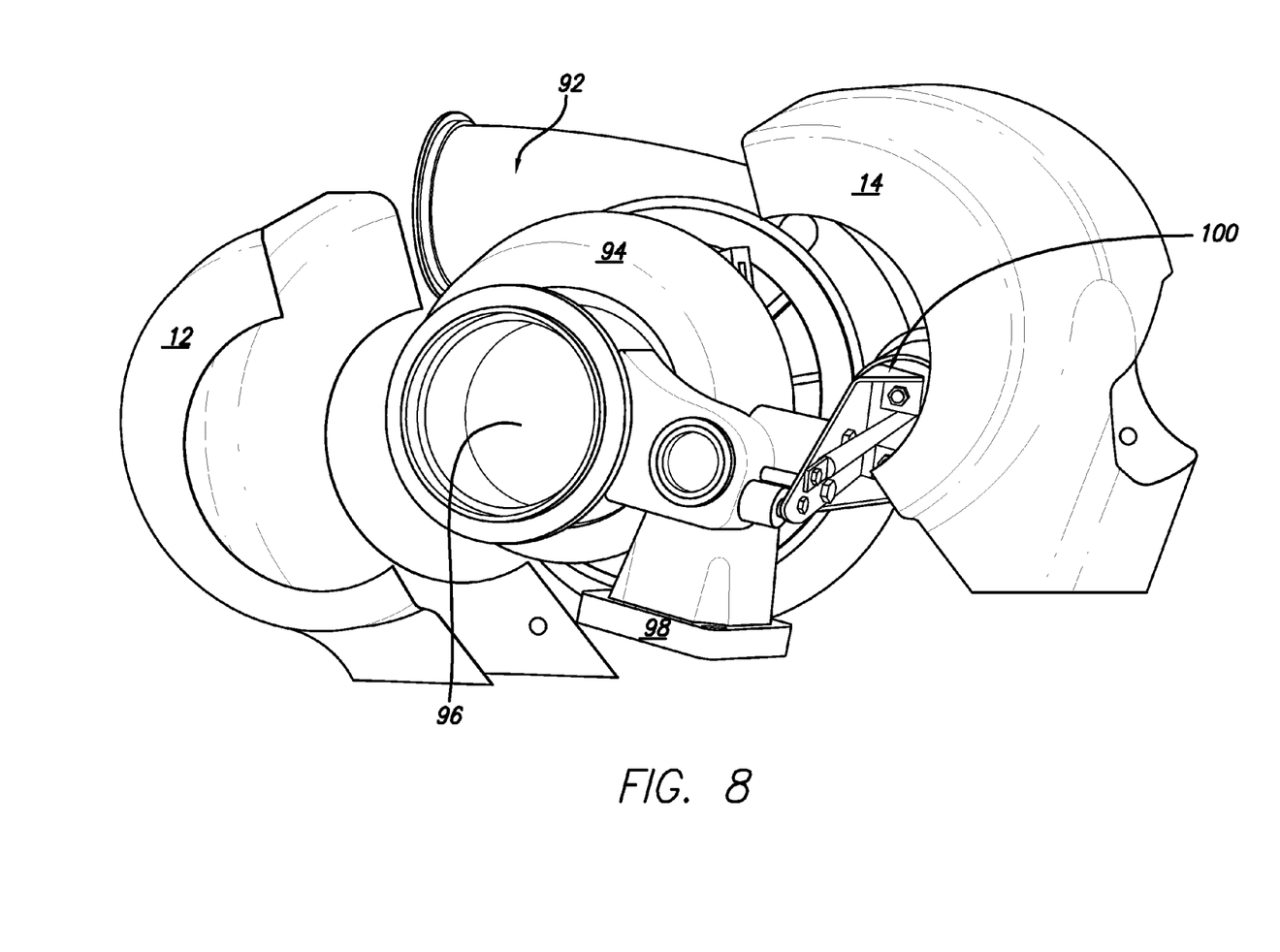
FIG. 8 is an exploded perspective side view of the first and second shield members as used to attach to a turbocharger.

FIG. 8 illustrates an example construction comprising a heat shield 90 as disposed around a turbocharger 92. In this particular figure, the heat shield is shown in a dissembled state with the first and second shield members 12 and 14 positioned for attachment around a turbine housing 94 of the turbocharger. The first and second shield members 12 and 14 are configured in the manner disclosed above and as illustrated in FIGS. 1 to 6. The first and second shield members are positioned around the desired portion of the turbocharger to be covered, are placed into contact with one another, and are attached to one another to provide a secure structure surrounding the desired portion of the turbocharger.

Figure 9:
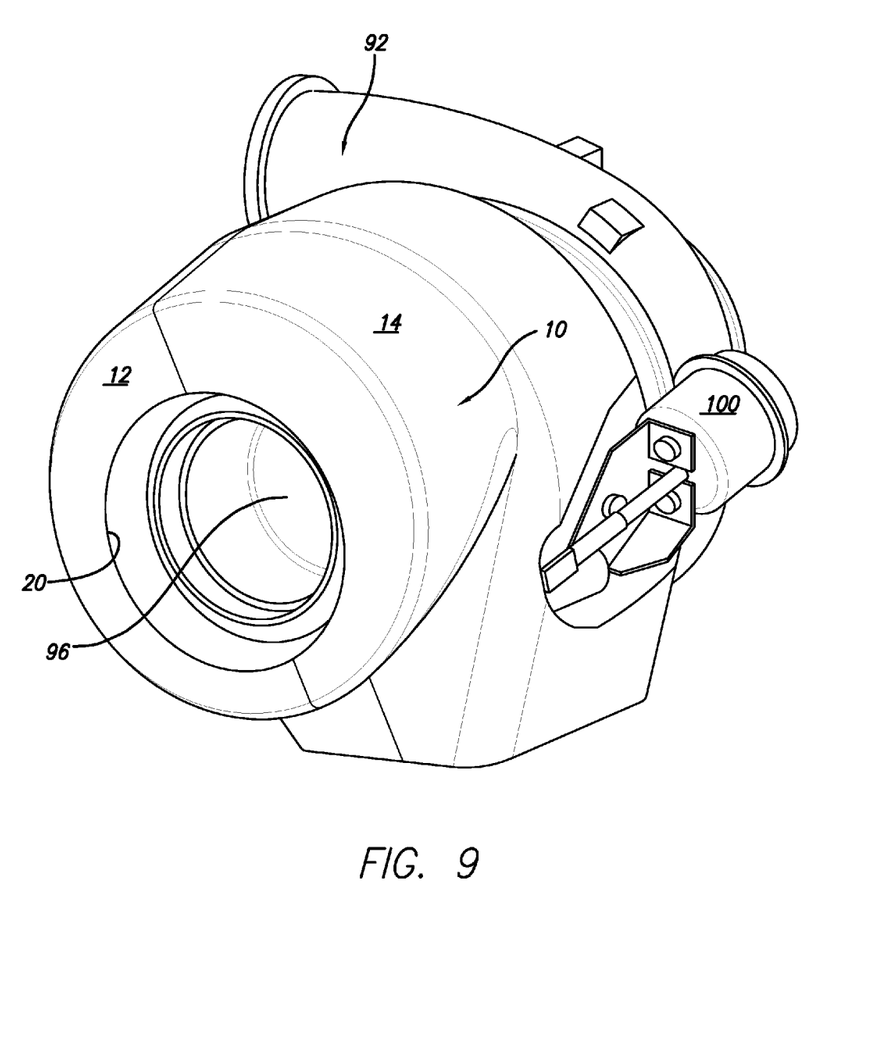
FIG. 9 is an perspective side view of the first and second shield members attached to one another and positioned to cover a desired portion of the turbocharger.

FIG. 9 illustrates the example construction of FIG. 8 where the two shield members 12 and 14 have been attached together surrounding the desired portion, e.g., the turbine housing, of the turbocharger 92. As illustrated, the turbocharger heat shield 10, formed from the combined first and second members 12 and 14, operates to surround and isolate the desired portion of the turbocharger, in this case the turbine housing, thereby operating to protect a person from directly contacting turbine housing and potentially being burned by the same during operation of the turbocharger. As illustrated in FIG. 9, the heat shield is configured such that the opening 20 permits access to an exhaust gas outlet 96 of the turbine housing. Also, as best shown in FIG. 8, the heat shield 10 is configured to that it permits access to an exhaust inlet 98 of the turbine housing.

The heat shield illustrated in FIGS. 8 and 9 is shown with the actuator member portion of the shield removed for the purpose of showing an actuator 100 that is attached to the turbocharger. The actuator can be used, e.g., to move a valve such as when used in conjunction with a wastegate or the lake, and/or one or more variable geometry members within the turbocharger. The heat shield actuator member is attached to the second member 14 and is configured to cover the actuator member in a manner that does not impair its desired operational movement.

A feature of turbocharger heat shields prepared according to principles of this invention is that they are formed from two or more structurally rigid members that are specifically configured to both surround and insulate a desired portion of the turbocharger, and do so in a manner that does not impair the desired operation of the turbocharger. A further feature of such turbocharger heat shields is that they can be formed from a material, while being structurally rigid, is also aesthetically pleasing. A further feature of such turbocharger heat shields is that they are formed from two or more members that are configured to provide an aligned slip-fit engagement with one another. A further feature of such turbocharger heat shields is that they can operate to protect the surrounded portion of the turbocharger from adverse environmental effects. A still further feature of such turbocharger heat shields is that they protect a user from being potentially burned by preventing a user from coming into direct contact with the desired surrounded portion of the turbocharger.

A turbocharger heat shield for attachment over at least a portion of a turbocharger assembly comprises a first heat shield member that is provided in the form of a wall structure. The first heat shield member is configured to fit over a portion of the turbocharger housing and includes means for aligning and engaging with an adjacent portion of a second heat shield member. The second head shield member is configured to fit over another portion of the turbocharger housing. Adjacent edge surfaces of the first and second heat shield members are positioned together, and the first and second heat shield members are removably attached together. The first and second heat shield members further include an insulating material disposed therein and interposed between the turbocharger housing and an inside wall of the first and second heat shield members. Wherein one or both of the first and second heat shield members include one or more alignment tabs that are positioned to assist in the alignment and engagement of an adjacent edge of the other of the first and second heat shield members.

Having now described the invention in detail as required by the patent statutes, those skilled in the art will recognize modifications and substitutions to the specific embodiments disclosed herein. Such modifications are with in the scope and intent of the present invention.

What is claimed is:

1. A turbocharger assembly comprising:
a turbine housing, a center housing, a compressor housing, and a shaft extending axially through the center housing, the shaft having a turbine wheel attached at one end within the turbine housing, and having a compressor impeller attached at an opposite end within the compressor housing;
a heat shield disposed over at least a portion of the one or more of the turbine housing, center housing, and compressor housing, the heat shield comprising:
a first heat shield member comprising a wall structure; and
a second head shield member comprising a wall structure that is configured to removably attach with the first heat shield member;
wherein the first and second heat shield members combine to surround at least a portion of the turbine housing, and when combined forms a seam therebetween that extends parallel relative to the shaft; wherein one or both of the first and second heat shield members comprises one or more tabs that are positioned to assist in the alignment and engagement of an adjacent edge of the other of the first and second heat shield members.

2. The turbocharger assembly as recited in claim 1 wherein the one or more tabs are positioned to register with an inside surface of the other of the first or second heat shield member.

3. The turbocharger assembly as recited in claim 1 wherein the one or more tabs includes a feature for accepting attachment of a threaded or nonthreaded attachment member for removably attaching the first and second heat shield members together.

4. The turbocharger assembly as recited in claim 1 wherein the heat shield comprises an insulating material disposed therein and interposed between the turbocharger and the heat shield.

5. The turbocharger assembly as recited in claim 4 wherein the insulating material is attached to an inside wall of the heat shield.

6. The turbocharger assembly as recited in claim 1 wherein the heat shield includes a third heat shield member that is attached to one of the first and second heat shield members and that is positioned over a movable member of the turbocharger assembly.

7. The turbocharger assembly as recited in claim 1 wherein the first and second heat shield members are each semicircular in configuration having cylindrical wall surfaces.

8. The turbocharger assembly as recited in claim 1 wherein the heat shield comprises openings positioned at opposed axial surfaces to facilitate the passage of different portions of the turbocharger assembly therethough.

9. The turbocharger assembly as recited in claim 8 wherein the heat shield further comprises a radially opening between the opposed axial openings to facilitate the passage of a different portion of the turbocharger assembly therethrough.

10. A turbocharger assembly comprising:
a turbine housing, a compressor housing, and a center housing interposed therebetween and comprising a shaft disposed therein;
a heat shield disposed over the turbine housing and comprising:
a first heat shield member comprising a cylindrical wall structure and opposed axial openings;
a second heat shield member comprising a cylindrical wall structure and opposed axial openings, wherein the cylindrical wall structures of each of the first and second heat shield members have an outermost surfaces that are configured to completely cover respective segments of an outermost surface of the turbine housing having, the first and second heat shield outermost surfaces having a radius of curvature relative the to respective opposed axial openings;
wherein the first and second heat shield members are removably attached together to surround the turbine housing, wherein one of the axial opening is disposed around an exhaust outlet of the turbine housing and the other axial opening is disposed around a portion of the turbine housing attached with the center housing;
wherein the heat shield further comprises a radial opening to accommodate passage of an exhaust inlet into the turbine housing; and
wherein one of the first or second heat shield members includes one or more tabs projecting from an edge surface that registers with an adjacent edge surface of the other of the first or second heat shield member to facilitate alignment and attachment therebetween.

11. The turbocharger assembly as recited in claim 10 further comprising an insulating material disposed within the heat shield.

12. The turbocharger assembly as recited in claim 11 wherein the insulating material is attached to the heat shield.

13. The turbocharger assembly as recited in claim 11 further comprising a third heat shield member that is attached to one of the first and second heat shields and that is disposed over an element of the turbine housing.

14. A turbocharger assembly comprising:
a turbine housing, a compressor housing, and a center housing interposed therebetween comprising a shaft disposed therein;
a heat shield placed around the turbine housing to protect a person from making direct contact with the turbine housing, the heat shield comprising:
a first heat shield member provided in the form of a semicircular shell relative to an axis of the shaft, and having a cylindrical wall structure and opposed axial openings;
a second heat shield member provided in the form of a semicircular shell relative to the axis of the shaft, and having a cylindrical wall structure and opposed axial openings;
one or more tabs projecting from a lip of the first or second heat shield members that are positioned and sized to register with an adjacent lip of the other of the first or second heat shield member to facilitate alignment and attachment therebetween;
wherein the first and second heat shield members are removably attached together to surround the turbine housing, wherein an exhaust outlet of the turbine housing is disposed through one of the openings and a portion of the turbine housing attached with the center housing is disposed through the other of the openings, and wherein the heat shield further comprises a radial opening to accommodate passage of an exhaust inlet of the turbine housing.

15. The turbocharger assembly as recited in claim 14 further comprising an insulating material interposed between the turbine housing and the heat shield.

16. A turbocharger assembly comprising:
a turbine housing, a center housing, a compressor housing, and a shaft extending axially through the center housing, the shaft having a turbine wheel attached at one end within the turbine housing, and having a compressor impeller attached at an opposite end within the compressor housing;
a heat shield disposed over at least a portion of the one or more of the turbine housing, center housing, and compressor housing, the heat shield comprising:
a first heat shield member comprising a wall structure;
a second head shield member comprising a wall structure that is configured to removably attach with the first heat shield member, wherein the first and second heat shield members combine to surround at least a portion of the turbine housing, and when combined forms a seam therebetween that extends parallel relative to the shaft; and
a third heat shield member that is attached to one of the first and second heat shield members and that is positioned over a movable member of the turbocharger assembly.

* * * * *